(12) United States Patent
Markakis et al.

(10) Patent No.: US 7,076,996 B2
(45) Date of Patent: Jul. 18, 2006

(54) ENVIRONMENTAL SCANNING PROBE MICROSCOPE

(75) Inventors: Stephen M. Markakis, Santa Barbara, CA (US); Peter D. Lippire, Goleta, CA (US)

(73) Assignee: Veeco Instruments Inc., Woodbury, NY (US)

( * ) Notice: Subject to any disclaimer, the term of this patent is extended or adjusted under 35 U.S.C. 154(b) by 82 days.

(21) Appl. No.: 10/285,013

(22) Filed: Oct. 31, 2002

(65) Prior Publication Data

US 2004/0083799 A1 May 6, 2004

(51) Int. Cl.
*G01N 13/16* (2006.01)
*G01B 5/28* (2006.01)

(52) U.S. Cl. ...................................................... 73/105
(58) Field of Classification Search .................. 73/105; 250/306
See application file for complete search history.

(56) References Cited

U.S. PATENT DOCUMENTS

| | | | |
|---|---|---|---|
| 4,596,928 A | | 6/1986 | Dantilatos |
| 5,260,824 A | * | 11/1993 | Okada et al. .................. 73/105 |
| RE34,489 E | | 12/1993 | Hansma et al. |
| 5,362,964 A | | 11/1994 | Knowles et al. |
| 5,412,211 A | | 5/1995 | Knowles |
| 5,621,210 A | | 4/1997 | Lindsay |
| 5,675,154 A | | 10/1997 | Lindsay et al. |
| 5,750,989 A | | 5/1998 | Lindsay et al. |
| 5,821,545 A | | 10/1998 | Lindsay et al. |
| 5,857,341 A | | 1/1999 | Amakusa |
| 6,051,825 A | | 4/2000 | Lindsay et al. |
| 6,193,199 B1 | * | 2/2001 | Karam, II ................. 248/276.1 |

* cited by examiner

*Primary Examiner*—Daniel S. Larkin
(74) *Attorney, Agent, or Firm*—Boyle Fredrickson Newholm Stein & Gratz S.C.

(57) ABSTRACT

An apparatus and method of analyzing a sample to be scanned within a hermetically sealed housing of an atomic force microscope (AFM) while the interior of the housing is maintained at one of a number of various environmental conditions. The AFM includes an XYZ stage assembly on which a sample holder supporting the sample may be releasably positioned. The stage assembly allows for the manipulation of the sample and sample holder in the X, Y and Z axes without disturbing any environmental condition present within the chamber due to the hermetic seal maintained between the stage assembly and the AFM during the motion of the stage assembly. The ability of the stage assembly to manipulate the sample in each of the three directions while the sample is enclosed within the AFM also allows the AFM to compensate for non-parallel scanning planes and for drift in all three directions occurring in the sample because of the different environmental conditions in which the sample may be scanned. The scan is performed by the AFM using a scanning tube sealingly disposed within the housing and capable of moving small distances in the X, Y and Z axes. Fine adjustments to the position of the tube in order to accurately scan the sample are accomplished by the inclusion of sectioned piezoelectric elements within the tube which are capable of adjusting the position of a probe or cantilever attached to the end of the tube in small, highly accurate distances in each of the X, Y and Z directions.

42 Claims, 10 Drawing Sheets

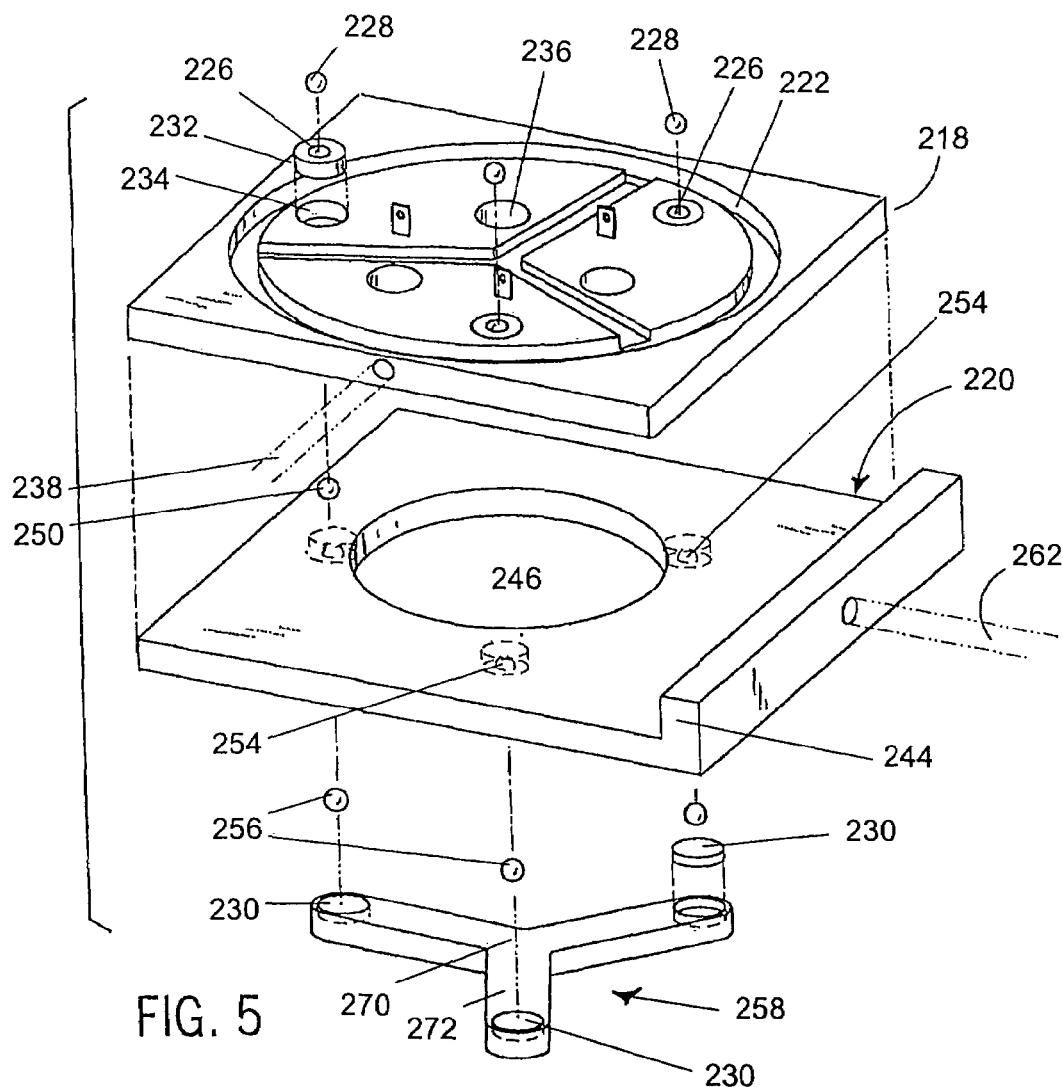
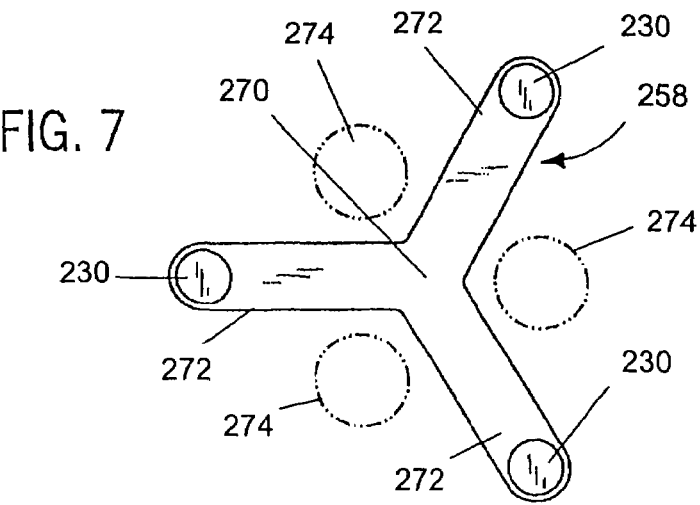

ENVIRONMENTAL SCANNING PROBE MICROSCOPE

BACKGROUND OF THE INVENTION

1. Field of the Invention

The present invention relates to scanning probe microscopes (SPMs) including atomic force microscopes (AFMs) and, particularly, to an AFM that has a hermetically sealed superstructure that allows analyzation of a sample under different environmental conditions.

2. Description of the Related Art

An Atomic Force Microscope ("AFM"), as described for example, in U.S. Pat. No. RE34,489 to Hansma et al. ("Hansma"), is a type of scanning probe microscope ("SPM"). AFMs are high-resolution surface measuring instruments. Two general types of AFMs include contact mode (also known as repulsive mode) AFMs, and cyclical mode AFMs (periodically referred to herein as TappingMode.TM. AFMs). (Note that TappingMode.TM. is a registered trademark of the present assignee.)

The contact mode AFM is described in detail in Hansma. Generally, the contact mode AFM is characterized by a probe having a bendable cantilever and a tip. The AFM operates by placing the tip directly on a sample surface and then scanning the surface laterally. When scanning, the cantilever bends in response to sample surface height variations, which are then monitored by an AFM deflection detection system to map the sample surface. The deflection detection system of such contact mode AFMs is typically an optical beam system, as described in Hansma.

Typically, the height of the fixed end of the cantilever relative to the sample surface is adjusted with feedback signals that operate to maintain a predetermined amount of cantilever bending during lateral scanning. This predetermined amount of cantilever bending has a desired value, called the set-point. Typically, a reference signal for producing the set-point amount of cantilever bending is applied to one input of a feedback loop. By applying the feedback signals generated by the feedback loop to an actuator within the system, and therefore adjusting the relative height between the cantilever and the sample, cantilever deflection can be kept constant at the set-point value. By plotting the adjustment amount (as obtained by monitoring the feedback signals applied to maintain cantilever bending at the set-point value) versus lateral position of the cantilever tip, a map of the sample surface can be created.

The second general category of AFMs, i.e., cyclical mode or TappingMode.TM. AFMs, utilize oscillation of a cantilever to, among other things, reduce the forces exerted on a sample during scanning so as to minimize tip and/or sample damage, for example. In contrast to contact mode AFMs, the probe tip in cyclical mode makes contact with the sample surface or otherwise interacts with it only intermittently as the tip is scanned across the surface. Cyclical mode AFMs are described in U.S. Pat. Nos. Re 36,488, 5,226,801, 5,412,980 and 5,415,027 to Elings et al.

In U.S. Pat. No. 5,412,980, a cyclical mode AFM is disclosed in which a probe is oscillated at or near a resonant frequency of the cantilever. When imaging in cyclical mode, there is a desired tip oscillation amplitude associated with the particular cantilever used, similar to the desired amount of cantilever deflection in contact mode. This desired amplitude of cantilever oscillation is typically kept constant at a desired set-point value. In operation, this is accomplished through the use of a feedback loop having a set-point input for receiving a signal corresponding to the desired amplitude of oscillation. The feedback circuit adjusts the vertical position of either the cantilever mount or the sample by applying a feedback control signal to a Z axis actuator so as to cause the probe to follow the topography of the sample surface.

Typically, the tip's oscillation amplitude is set to be greater than 20 nm peak-to-peak to maintain the energy in the cantilever arm at a much higher value than the energy that the cantilever loses in each cycle by striking or otherwise interacting with the sample surface. This provides the added benefit of preventing the probe tip from sticking to the sample surface. Ultimately, to obtain sample height data, cyclical mode AFMs monitor the Z actuator feedback control signal that is produced to maintain the established set-point. A detected change in the oscillation amplitude of the tip and the resulting feedback control signal are indicative of a particular surface topography characteristic. By plotting these changes versus the lateral position of the cantilever, a map of the surface of the sample can be generated.

Notably, AFMs have become accepted as a useful metrology tool in manufacturing environments in the integrated circuit and data storage industries. A limiting factor to the more extensive use of the AFM was the inability to change the environmental conditions in which a particular sample positioned within the AFM is analyzed. For example, due to various operating conditions, it is desirable to determine the effects that these conditions will have upon various samples, such as elevated or reduced temperatures and pressures. However, because most AFMs are constructed to be utilized only at ambient temperatures and pressures, such AFMs are not sealed as environmental conditions experienced by the sample do need to be altered from the ambient. Although attempts have been made to offer environmental capability, there are significant drawbacks associated with performing tests under varying environmental conditions with existing AFMs.

More particularly, some recent AFM designs have been adapted to enable samples to be tested under varying environmental conditions. Examples of AFMs having this capability are described herein. In one known system, a cover is releasably and sealingly engaged with a chamber containing the sample to be scanned. The cover also includes resilient seals disposed around the moving parts of the AFM that extend into the chamber, such as the screws or Z actuator(s) and the cantilever tube. The sealing engagement of the cover with the moving parts and the chamber enables the sample contained within the chamber to be placed within a number of different environmental conditions, such as under a protective fluid, in the presence of a particular gas, or the like.

However, due to the imperfect seal created between the cover and the chamber, it is difficult to obtain stable variations in the environment surrounding the sample. For example, any gases discharged to the chamber may slowly escape overtime from the AFM past the seals created between the chamber and the cover if the seal is not formed correctly when the cover is engaged with the chamber, or when the seals surrounding the moving parts are disturbed when those parts are moving. Further, because the seal between the cover and the instruments and chamber is not hermetic, the seal can only withstand a certain pressure differential before failure, such that very low pressure environmental conditions, such as a vacuum, cannot be established within the AFM environment.

In another system, all of the components of the AFM are contained within a sealed chamber such as a bell jar. The AFM components are monitored by a controller connected to the components by feed throughs extending through the base of the bell jar in order to operate the AFM as needed. Further, gas inlets and outlets can be extended through the bell jar base to enable the environmental conditions within the bell jar to be altered, such as by introducing a specific gas, or removing all gases present within the jar to form a vacuum.

In another similar AFM, each of the components of the AFM are disposed within a bell jar that is sealingly connected to a base to completely enclose the interior of the jar. The AFM components are controlled using feed throughs extending through the base and connected to an exterior controller in order to conduct the analysis of the sample located inside the bell jar. Using the feed throughs, various environmental conditions can be created within the bell jar such that a sample can be evaluated in each of the different conditions.

Because each of the above-mentioned AFM is constructed using a sealed bell jar, they are capable of changing the environmental conditions present within the AFM. However, the construction of these types of AFMs makes it highly difficult to either change or alter the position of a sample being analyzed within the AFM that is undergoing analysis, such as to measure different selected areas of the sample surface or to compensate for sample drift. This is because the construction of the prior art bell jar AFMs requires that the seal between the cover and the bell jar be broken in order to access the sample disposed within the AFM. In doing so, the environmental conditions formed within the AFM are necessarily dissipated, such that once the sample is either changed or repositioned, the AFM must be resealed and the desired environmental conditions must be regenerated within the AFM. Thus, much time and effort is exhausted in simply duplicating the environmental conditions within the AFM.

Also, with regard to the positioning of the probe or cantilever tip with respect to the sample, most prior art AFMs utilize a piezoelectric element in order to move the cantilever closer to or away from the sample. Piezoelectric elements are normally used for this purpose due to the fact that the elements can be actuated by the application of a voltage to the element in order to move the cantilever very small distances, on the order of around one micron, in order to engage the sample as needed.

However, based on the inherent construction of the piezoelectric elements used, the elements are subject to a certain amount of error with regard to the distance that the cantilever is moved by the element. For example, if an element is sent a specific voltage differential in order to actuate the element and move the cantilever a specified distance, the actuation of the element may be accompanied by noise which causes the element to move the cantilever a distance slightly greater or less than that specified. When the distance the cantilever is to be moved is significantly greater than the error factor, the error factor does not significantly effect the position of the cantilever. However, when the cantilever is only to be moved a very short distance, the error factor can greatly effect the positioning of the cantilever. This can cause inaccurate or even worthless data. This problem is of particular concern when the environmental conditions associated with the experiment are altered from the ambient; for example, thermal drift can exacerbate positioning errors.

In sum, one significant drawback of prior art AFMs is that the sample cannot be readily manipulated within the AFM when a non-ambient environmental condition, such as reduced pressure or temperature is present within the AFM. As a result, the metrology field was in need of an AFM having the capability of altering the position of the sample within the AFM without interrupting the environment created within the AFM.

Another drawback of prior art AFMs is that the piezoelectric elements utilized to move the cantilever with respect to the sample when scanning the sample are greatly affected by noise in the voltage differentials applied to the elements to move the cantilever only a small distance. Therefore, it is also desirable to provide an improved piezoelectric actuator which greatly reduces the effect of the noise of the system on the movement of the cantilever by the actuator over a short distance.

SUMMARY OF THE INVENTION

A preferred embodiment of this invention overcomes the drawbacks of prior art AFMs by providing a scanning probe microscope that enables a sample to be moved in all three axes within the AFM without disturbing a non-ambient environment created within the AFM. Each of the components of the AFM is sealingly engaged with the superstructure to provide an enclosed, hermetically sealed environment in which the sample can be analyzed.

According to a first aspect of the invention, the AFM includes an XYZ stage assembly sealingly engaged with the bottom of the superstructure for positioning and moving the sample within the superstructure. The stage assembly includes a pair of sliding or translation plates for moving the sample in the X and Y axes, and a number of vertical actuators to move the sample in the Z axis, all of which are connected to an interface or sample support stage disposed inside the superstructure. The stage assembly can be manipulated by controls located on the exterior of the AFM in order to manually or automatically position the sample as desired within the AFM.

According to another aspect of the preferred embodiment, the AFM also includes a head assembly hermetically sealed to the superstructure opposite the stage assembly. The head assembly includes a scanning tube including a number of piezoelectric elements and having a probe or cantilever disposed at one end within the superstructure adjacent the stage assembly. The tube is sealingly engaged with the superstructure opposite the cantilever within a tube mount plate that can be releasably secured to the superstructure. The engagement between the tube and the mount plate allows the tube to move freely along the X, Y and Z axes because the engagement of the tube with the mount plate is spaced from the mobile portions of the tube.

According to still another aspect of the preferred embodiment, the scanning tube includes sectioned piezoelectric elements which are used to move the tube sections and position the probe where desired with respect to the sample. The sectioned piezoelectric elements include a larger section that is actuated when relatively large cantilever movements are necessary, and a small section that is used when fine adjustments in the position of the cantilever are made. The small section enhances the fine positioning of the cantilever by reducing the effect of the noise contained in the voltage differential used to actuate the small section of the piezo element. The piezoelectric elements can be sectioned either physically or by an conductive metallic coating placed on the exterior of the element in order to enable incoming voltage signals to activate the desired section of the element.

In another aspect of this embodiment, the XYZ stage assembly of the AFM incorporates a sample holder locating pin attached to the interface stage of the assembly. The locating pin operates to help ensure that a sample holder positioned on the interface stage assembly will remain aligned with the probe regardless of any drift occurring in the sample or the sample holder based on the changing environmental conditions within the AFM.

According to still a further aspect of the preferred embodiment, the AFM can be operated in a manner that is capable of initially determining whether the sample to be scanned is positioned on a plane parallel to the scan plane of the cantilever. If the sample is not positioned parallel to the probe, the AFM can automatically adjust the position of the sample utilizing the Z actuators connected to the stage assembly disposed within the superstructure to tilt the stage assembly on which the sample is positioned such that the sample is disposed parallel to the scan plane of the probe.

In yet another aspect of the preferred embodiment, a scanning probe microscope includes a superstructure defining a hermetically sealed interior within which a probe and a sample are disposed such that the SPM can image the sample under a non-ambient condition. The SPM also includes a stage assembly hermetically sealed to the superstructure and configured to support the sample. In operation, the stage assembly can translate the sample without disturbing the non-ambient condition.

In another aspect of this embodiment, the SPM includes a tube actuator having opposed ends. The opposed ends include a first end that is generally fixed and a second end that translates the probe. Moreover, the actuator is sealed to the superstructure at the fixed end to allow movement of the tube actuator, and thus the probe, under any environmental condition without compromising the hermetic seal provided by the superstructure.

According to a still further aspect of this embodiment, the stage assembly includes a sample support stage for receiving a sample holder. Preferably, the sample support stage includes an indexing element to position the sample holder at a preselected position relative to the probe. And, the indexing element is preferably a pin extending outwardly from the sample support stage and operates to minimize adverse expansion/contraction effects due to changed environmental conditions.

These and other objects, features and advantages of the invention will become apparent to those skilled in the art from the following detailed description and the accompanying drawings. It should be understood, however that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 5 is an exploded view of the sliding translation plates and plate support of an x, y, z stage assembly shown in FIG. 3;

FIG. 7 is a top plan view of the plate support for the x and y sliding translation plates;

DETAILED DESCRIPTION OF THE PREFERRED EMBODIMENT

Figure 1:
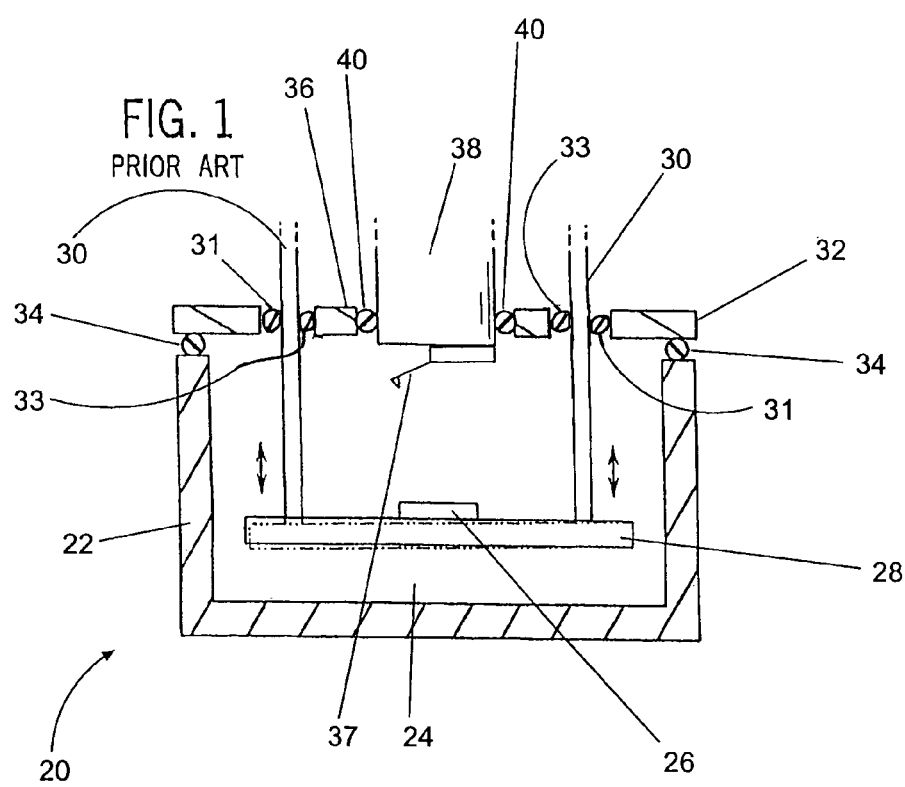
FIG. 1 is a cross-sectional view of a prior art sealed atomic force microscope illustrating the vertical movement of a sample disposed within the AFM.

Turning initially to FIG. 1, an example of a conventional AFM structure 20 for performing environmental AFM measurements is illustrated. The conventional AFM 20 includes a chamber 22 defining an open interior 24 in which a sample 26 can be positioned. The sample 26 is supported on a platform 28 that is vertically movable within the chamber 22 by the actuation of a pair of screws 30 secured to opposite sides of the platform 28. The screws 30 extend upwardly through openings 31 in a cover 32 positioned over the chamber 22 in order to completely enclose the chamber 22. The cover 32 includes a pair of first sealing members 33 disposed within the openings 31 that surround and sealingly engage the screws 30 and a peripheral sealing member 34, such as a rubber gasket. The sealing member 34 is positioned around the periphery of the cover 32 and engages the chamber 22 in order to provide a seal between the chamber 22 and the cover 32 that effectively encloses the interior 24 of the chamber 22. The cover 32 also includes a central opening 36 disposed between the openings 31 in which the lower end of a scanning tube 38 can be disposed. The exterior of the tube 38 is engaged with a second sealing member 40 (e.g., an O-ring) extending along the periphery of the opening 36 in order to provide a sealed engagement between the tube 38 and the cover 32. The positioning of the second sealing member 40 also allows the scanning tube 38 to be moved vertically with respect to the interior 24 of the chamber 22, such that a probe 37 coupled to the scanning tube 38 can selectively engage the sample 26 located on the platform 28.

To use the conventional AFM 20, initially the sample 26 is positioned on the platform 28. The cover 32 can then be sealingly engaged over the interior 24 of the chamber 22. The screws 30 can then be adjusted relative to the scanning tube 38 in order to position the tube 38, and thus the probe 37, adjacent the sample 26 prior to scanning the sample 26. The environment within the chamber 22 can then be altered by heating or cooling the gas within the chamber 22, or by removing or changing the gas present within the chamber 22. After the environmental conditions within the chamber 22 have been altered as desired, the tube 38 and platform 28 can be vertically adjusted with respect to one another to engage the tube 38 with the sample 26 in order to perform the analysis.

However, on many occasions the sample 26 will need to be adjusted on the platform 28 along the X or Y axis in order to properly align the sample 26 with the tube 38. This may be due to the user's desire to analyze different portions of the sample 26, or because changed environmental conditions caused a certain degree of drift within the AFM 20. In order for the position of the sample 26 to be adjusted on the platform 28 along the X or Y axis, the cover 32 must be removed from the chamber 22, allowing any environmental condition created within the chamber 22 to be disrupted. Once the sample 26 is properly repositioned, the cover 32 and chamber 22 must be resealed and environmental condition previously generated within the chamber 22 must be recreated in order to perform the desired scan on the sample 26.

Moreover, after adjusting the position of the platform 28 and tube 38 with respect to one another, it may also be necessary to adjust the environmental conditions within the chamber 22 to the previous levels, although typically not.

Figure 2:
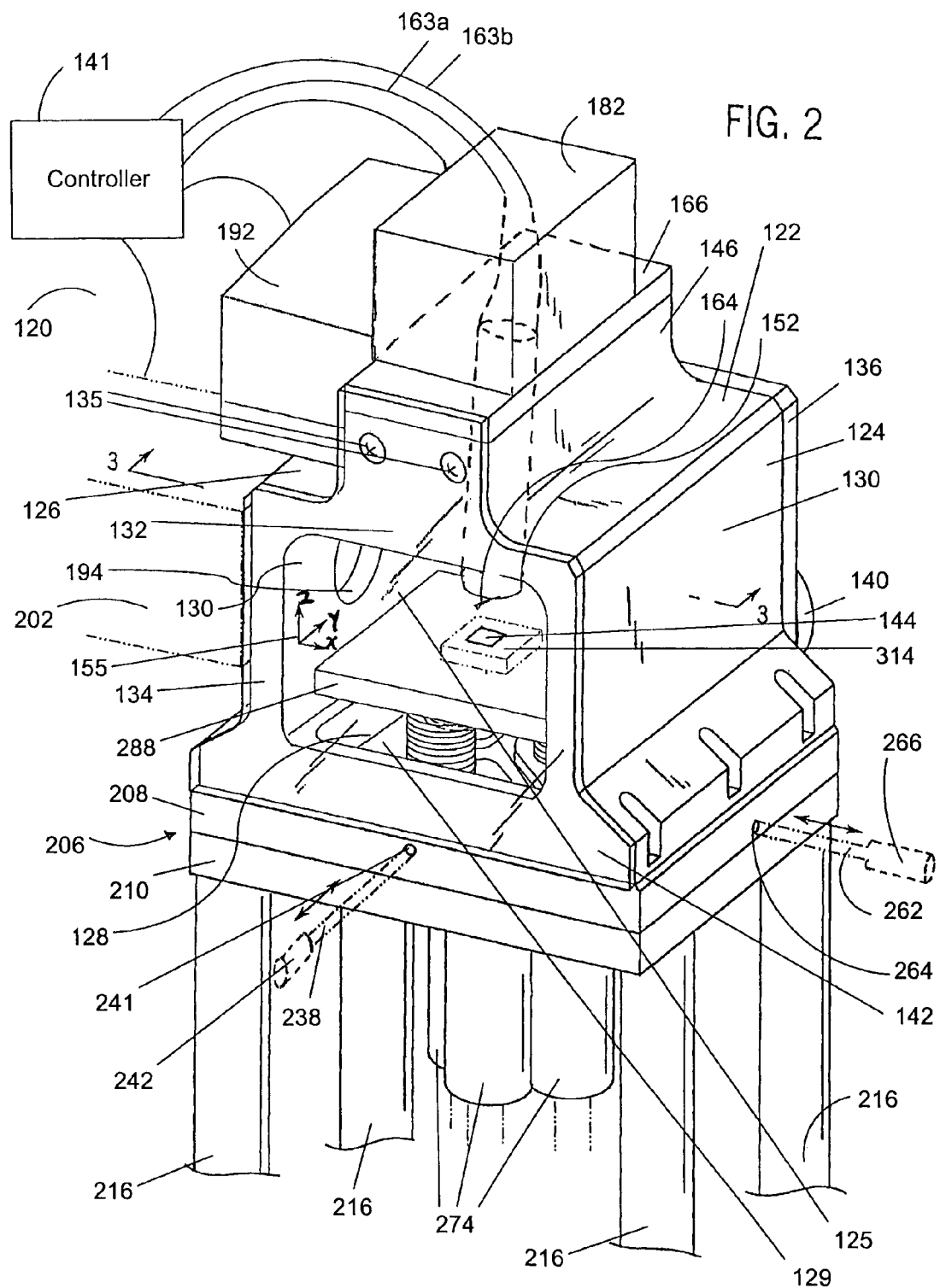
FIG. 2 is an isometric view of the hermetically sealed AFM constructed according to the preferred embodiment.
Figure 3:
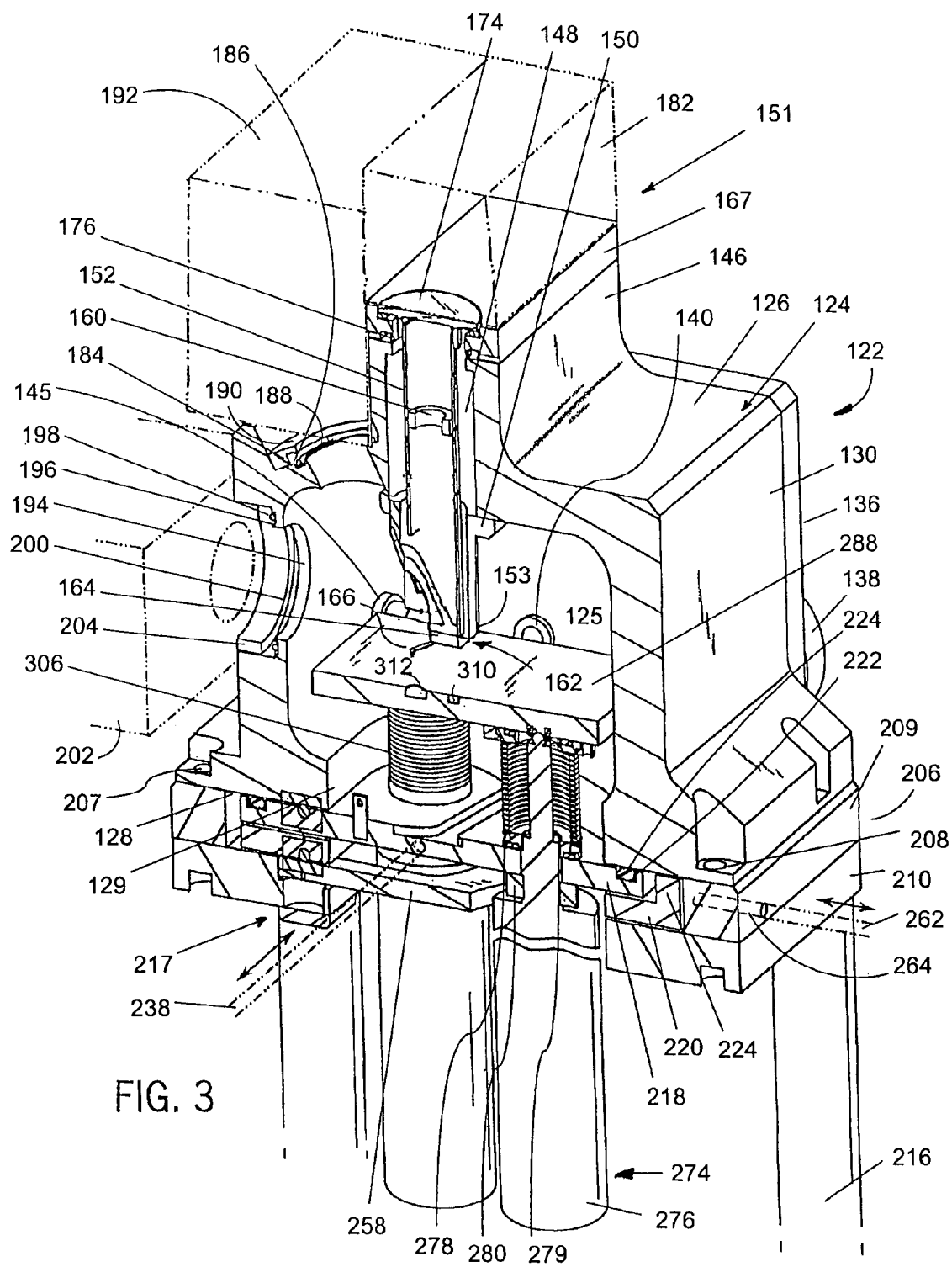
FIG. 3 is a cross-sectional view along line 3—3 of FIG. 2.

Referring now to FIGS. 2 and 3, a sealed AFM 120 constructed according to the preferred embodiment is illustrated which overcomes the deficiencies of the conventional AFM 20 and other similar AFMs. The AFM 120 includes a hermetically sealed superstructure 122 that is formed from a body 124 integrally formed of a rigid material, such as a metal, and preferably a stainless steel such as INVAR®. The body 124 defines an interior chamber 125 and includes an upper wall 126 and a lower wall 128 that defines a central opening 129, joined by a pair of opposed side walls 130. The body 124 also includes a front wall 132 including a window 134. The window 134 in the front wall 132 is hermetically sealed by a sheet of transparent material 142 that is fixedly and sealingly engaged with the front wall 132 by bolts 135. The sheet 142 allows a sample 144 positioned within the AFM 120 to be viewed, for example during positioning a scanning of the sample 144. The rear of the body 124 is generally open and is covered by a removable back panel 136 that is sealingly engageable with the body 124. The back panel 136 allows access to the chamber 125 and includes a vacuum flange 138 and a first hermetic feed through 140 to enable gases to pass into and out of the superstructure 122 when the AFM 120 is in operation. A second feed through 145 is located on one side wall 130, as shown in FIG. 3. The first and second feed throughs 140 and 145 allow static connections, such as electric leads, to be made between components inside the AFM 120 and a controller 141 outside the AFM 120 without comprising the hermetic sealing of the AFM 120.

Figure 4:
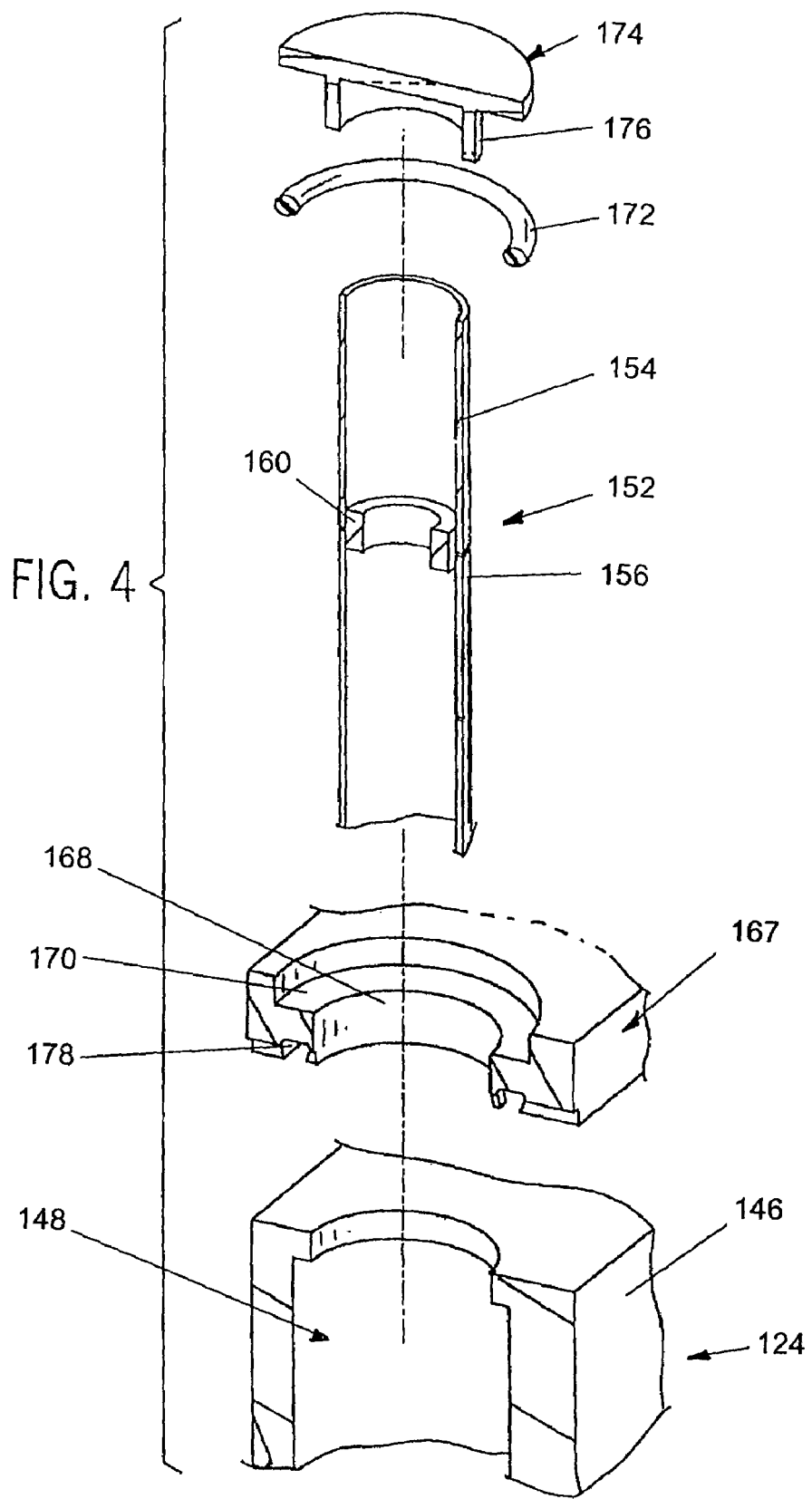
FIG. 4 is an exploded cross-sectional view of a scanning tube mount shown in FIG. 3.

With continued reference to FIGS. 2–4, the body 124 includes an integral pedestal 146 extending upwardly from the upper wall 126 of the body 124. The pedestal 146 includes a throughbore 148 extending downwardly into the interior chamber 125 of the body 124. In the interior chamber 125, the throughbore 148 is aligned with a tube housing 150 that is secure to and extends downwardly from the upper wall 126.

A head assembly 151 including a piezoelectric scanning tube 152, a mount plate 166, a window 174, and a light source (e.g., a laser) 182 is releasably fixed to the pedestal 146. The head assembly 151 can be removed from the pedestal 146 such that, if any of the components of the head assembly 151 become damaged or are not functioning properly, the entire head assembly 151 can be removed for repair from the pedestal 146 and replaced without having to disassemble the parts of the head assembly 151 from one another. Piezoelectric scanning tube 152 is positioned within and extends downwardly through the throughbore 148 and housing 150. The scanning tube 152 is formed of a piezoelectric material and includes an upper section or actuator 154 and a lower section or actuator 156. The lower section 156 is joined to the upper section 154 by a coupling 160, which is preferably made of an insulative material.

Electrodes (not shown) disposed on the elongated piezoelectric tube sections are each connected to the exterior controller 141 by leads 163a and 163b, respectively, that are capable of transmitting a voltage differential across the electrodes coupled to actuators 154, 156. When a voltage is applied to the electrodes the sections 154, 156 are caused to contract or expand and consequently move the scanning tube 152 a specified distance depending upon the magnitude of the voltage applied to the elements 154 and 156. Based on their particular construction and/or configuration, each of the sections 154, 156 will move a specific distance based upon the voltage applied to the elements. In the preferred embodiment, piezoelectric section 154 is designed to provide tube movement, and then translation of the probe coupled to the distal or free end 153 of tube 152, along the X and Y axes, illustrated by the axis reference 155 in FIG. 2, while section 156 provides tube movement in response to appropriately applied voltages. In this manner, the position of the lower end 153 of the scanning tube 152 can be adjusted within the body 124 over the range of movement for element 156, which is approximately five (5) microns, and element 154, which is about 100 μm. Notably, by positioning the X-Y section 154 of tube 152 further from the probe, the movement of the probe in X and Y is amplified (lever effect) which is desirable due to limited scan ranges associated with piezoelectric tubes.

Figure 8:
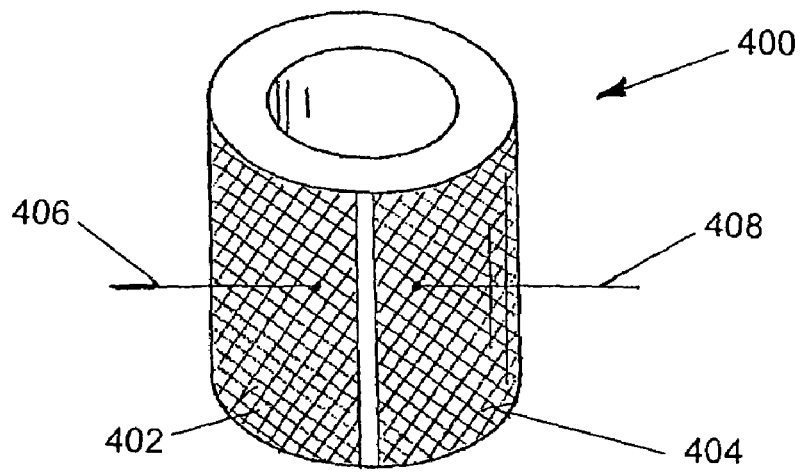
FIG. 8 is an isometric view of a prior art piezoelectric element utilized with a scanning tube.
Figure 9:
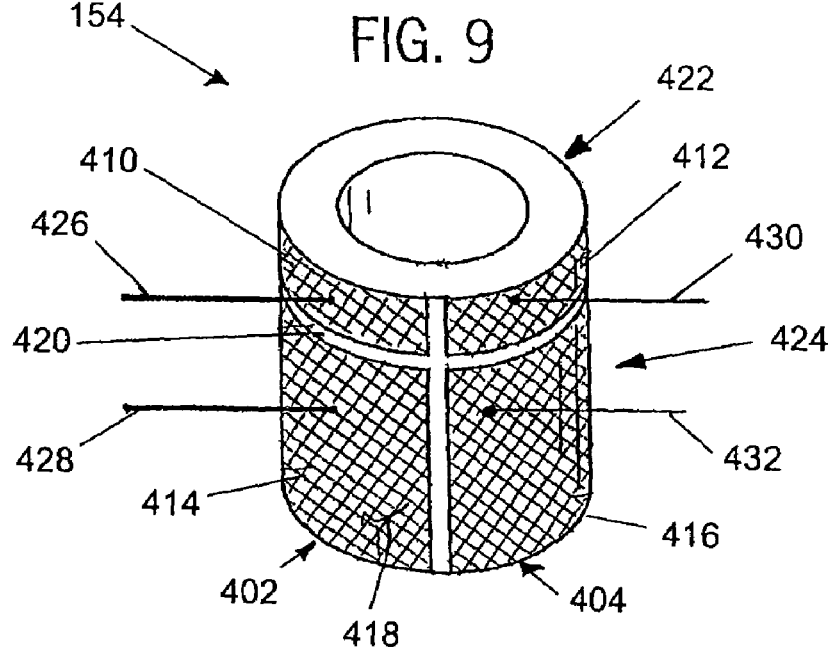
FIG. 9 is an isometric view of a sectioned piezoelectric element utilized with the scanning tube of the present invention.

Referring now to FIGS. 8 and 9, in a conventional AFM 20, piezoelectric sections 154 and 156 are formed as unitary elements 400 having electrodes 402, 404 disposed thereon that are operably connected to a pair of lead wires 406, 408 so that a voltage differential can be applied thereto. As stated previously, the amount of movement of the tube 152 generated by the activation of the specific element 154 or 156 is completely controlled by the voltage supplied to the piezoelectric element 400. The voltage applied to the piezoelectric section 154 or 156 necessarily has a certain amount of noise present within the voltage signal. Depending upon the particular sensitivity of the element 400, the noise present within the voltage signal can cause the element 400 to move the scanning tube 152 a distance greater or less than desired. For example, if the sensitivity of element 400 is one hundred (100) nanometers per volt, if ten (10) millivolts of noise are present in the voltage signal, the piezoelectric element 400 will move the scanning tube 152 an additional one (1) nanometer when this voltage is applied. Thus, noise, depending upon the size of the voltage signal, the sensitivity of the element 400, and the amount of movement desired for the tube 152, can seriously affect the accuracy of the movement of the tube 152 in response to the actuation of the element 400.

Referring now to FIG. 9, in one preferred embodiment the electrodes 402, 404 of one or both of sections 154, 156 are segmented into a first pair of upper electrodes 410, 412, and a second pair of lower electrodes 414, 416, 418. Notably, either or both piezoelectric actuators 154 and 156 can have electrodes segmented in this fashion. Preferably, the segmented electrodes are disposed on the piezoelectric actuators 154, 156 (154 in FIG. 9) by plating the outer surface areas of actuators 154, 156 with a metallic, conductive coating 418. A strip of the coating is then removed from the exterior of the actuator 154 in conventional fashion such that a nonconductive strip 420 is positioned around the perimeter of the actuator dividing the actuator into an upper section 422 and a lower section 424 having corresponding electrodes sized according to a selected sensitivity. Each section 422 and 424 is connected to a pair of leads 426, 428 and 430, 432, respectively, such that a voltage signal passed to the upper section 422 will not actuate the lower section 424, and vice versa. By segmenting either or both of the piezoelectric actuators 154 and 156, the tube system sensitivity can be modified. In particular, when a voltage differential is applied across section 422, which now has, for example, a sensitivity of ten (10) nanometers per volt due to its reduced size (i.e., the voltage differential is applied over a smaller surface area of the piezoelectric), and ten (10) millivolts of noise is present within the signal, the upper section 422 of scanning tube 152 only causes an additional $1/10^{th}$ of a nanometer of movement due to the noise. Thus, by segmenting actuators 154 and 156, it is possible to generate much more accurate movement of the probe with scanning tube 152. Again, small movements of tube 152 may be required based on a number of reasons, including for example noise within the applied voltage signal, so that a much more accurate scan of the sample 144 can be achieved.

Referring once again to FIGS. 2, 3 and 4, the free end of lower section 156 supports a probe assembly 162 including a probe holder 164 configured to receive an AFM probe 166. The holder 164 and probe 166 are similar to those disclosed in the above-noted references, such as those shown in U.S. Pat. Nos. Re34,489 and Re36,488, hereby incorporated by reference, and is used to generate a signal corresponding to, for example, the various topographical features of the sample 144 using one of the previously discussed methods of operation. Upon the activation of the piezoelectric actuators 154 and 156, the probe 166 can be moved along with the tube 152 with respect to the sample 144 in order to scan the surface of the sample 144.

Opposite the probe 166, the scanning tube 152 is sealingly secured to the pedestal 146. This is accomplished by providing a mount plate 167 that is releasably fixed to the pedestal 146. The plate 167 includes an opening 168 coaxially aligned with the throughbore 148 in the pedestal 146 through which the upper section 154 of the scanning tube 152 can be positioned. A circumferential recess 170 is disposed around the opening 168 opposite the pedestal 146 that is dimensioned to receive an O-ring sealing element 172 therein. The O-ring 172 is compressed against the plate 167 by a circular first window 174, formed of an optically transparent material, such as glass, in order to provide a hermetic seal between the window 174 and the mount plate 167. The window 174 also includes a downwardly extending collar 176 which has a diameter slightly larger than the exterior diameter of the scanning tube 152. The collar 176 extends downwardly into the opening 168 and is positioned around the upper section 154 of the tube 152. The collar 176 and upper section 154 are adhesively secured to one another in order to maintain the scanning tube 152 in position with respect to the mount plate 167 and the superstructure 122. Optionally, the mount plate 167 may also include a second recess 178 disposed about the opening 168 opposite the first recess 170 and in which is positioned another O-ring sealing member (not shown) in order to create the hermetic seal achieved between the mount plate 167 and the pedestal 146.

The window 174 is optically transparent in order to allow a collimated light beam to pass therethrough. The beam is supplied from a laser source 182 positioned on the mount plate 167 opposite the pedestal 146. The laser source 182 can be a conventional source utilized in AFM technology, such as a laser diode. The laser beam emitted by the source 182 is directed downwardly through the window 174 and into the scanning tube 152. The beam passes through the scanner 152 and strikes a reflective surface (not shown) located on the probe 166 opposite the sample 144.

Based upon the movement of the probe 166 due to its engagement with the topographical features of the surface of the sample 144, the laser beam is reflected upwardly at an angle through a second throughbore 184 disposed in the upper wall 126 adjacent the pedestal 146. A recess 186 is disposed around the second throughbore 184 on the exterior of the body 124 and receives an O-ring 188 therein. The O-ring 188 is sandwiched between a second transparent window 190, formed similarly to window 174, and the recess 186 to provide a hermetic seal around the second throughbore 184.

The beam passes through the transparent window 190 and out of the superstructure 122 to contact a laser detection unit 192, preferably mounted to the upper wall 126 of the superstructure 122. The structure of the detection unit 192 can be any conventional device utilized in AFM technology, and preferably is a quad-photodetector implemented as part of an optical lever detection scheme. Generally, the detection device 192 receives the reflected laser beam and detects the position of the beam.

In operation, probe 166 scans the surface of sample 144 at a selected set-point (e.g., a selected set-point oscillation amplitude in an oscillating mode, which the AFM maintains during scanning via feedback. The signals generated by maintaining AFM operation at the set point are indicative of surface characteristics. This data is then transmitted to a computer and stored, e.g., to generate a topography map.

More particularly, as probe 166 scans across various topographical features of sample 144, probe 166 deflects to an extent greater or less than specified by the set point, such that the laser beam striking the reflective surface on the probe 166 is reflected to a different portion of the detector 192. The position where the laser beam strikes the detector 192 is transmitted to the controller 141. The controller 141 then determines the amount of deflection represented by the laser beam position and ascertains the difference between the amount of deflection of the probe 166 registered by the detector 192 and the set point of deflection. The controller 141 then transmits appropriate signals to the scanner 152 to reposition the probe 166 at a position where the set point of deflection is reestablished, until the probe 166 again encounters a surface feature of the sample 144. The controller 141 continuously receives and utilizes the data from the detector 192 regarding the position of the laser beam in a feedback loop to continually reposition the probe 166 with respect to the sample 144 and obtain deflection measurements for the entire surface of the sample 144. This data is then analyzed by the controller 141 in order to generate an image of the scanned surface of the sample 144 to thereby determine surface characteristics of the sample 144. Notably, there are other feedback modes. For example, although an amplitude-based feedback scheme is discussed above (e.g., in an oscillation mode), all modes of AFM operation, including, for example, using the phase of the oscillating mode output as the control parameter, can be implemented in the preferred embodiment.

As best shown in FIGS. 2 and 3, the side wall 130 disposed adjacent the detection unit 192 also includes an opening 194 extending through the side wall 130. The opening 194 is encircled by a recess 196 in which is received an O-ring sealing member 198. The O-ring 198 is compressed within the recess 196 by a third transparent window 200, formed similarly to the first window 174, in order to hermetically seal the opening 194.

Opposite the interior chamber 125 of superstructure 122, an optics assembly 202 is disposed adjacent to the opening 194 in alignment with the window 200. The optics assembly 202 extends outwardly from the side wall 130 and provides a visual image to the user of the position of the sample 144 and probe 166 within the chamber 125. This image can be utilized to initially position the probe 166 at the region of interest of the sample 144 to ensure proper alignment More generally, the optics assembly 202 can be moved in the X, Y and Z directions in order to properly align the probe 166 and sample 144 to provide an accurate image of the positioning of the probe 166 with respect to the sample 144. For example, after the sample 144 is positioned in the chamber 125, the probe 166 and sample 144 can be engaged automatically by the controller 141 utilizing images provided by the assembly 202. The optics assembly 202 can be any conventional assembly, such as a high resolution camera, and will normally include a compression collar 204 disposed within the opening 194 that is secured to an optics assembly mount (not shown) which supports the camera (not shown). The compression collar 204 provides an additional sealing element within the opening 194 to enhance the hermetic seal within the opening 194.

Referring now to FIGS. 2, 3 and 5–7, the lower wall 128 of the body 124 is fixedly and sealingly secured to a base 206 by bolts 207, or similar fasteners, inserted through openings 208 in the superstructure 122. The base 206 includes an upper positioning member 209 and a lower support member 210 fixed to one another. The upper member 209 and lower member 210 are each configured similarly to the lower wall 128 of the body 124 and each include a central opening 212 and 214, respectively, that is aligned with the other and with the opening 129 in the lower wall 128. The lower support member 210 is further connected opposite the upper member 209 to a number of downwardly extending legs 216 which serve to support the AFM 120 above a surface (not shown) on which the legs 216 are positioned.

The base 206 encloses and supports an XYZ stage assembly 217 that is used to adjust the position of the sample 144 within the interior chamber 125 of the AFM 120 when the chamber 125 is maintained in a non-ambient environmental condition. The stage assembly 217 includes an upper glide plate 218, a lower slide plate 220, a support plate 258 disposed beneath the slide plates 218 and 220, a number of linear Z-actuators 274 (the function of which will become apparent below) that extend past the support plate 258 and through the slide plates 218 and 220, and an interface or sample support stage 288 for receiving a sample holder and which is disposed within the interior chamber 125 of the AFM 120 above the slide plates 218 and 220.

The area of the central opening 214 in the lower member 210 is smaller than the opening 212 in the upper member 209 such that the lower member 210 can retain the stacked slide plates 218 and 220 above the lower member 210 within the opening 212 in the upper member 209. The slide plates 218 and 220 have a length and width, and a combined height slightly less than that of the opening 212 so that the plates 218 and 220 can slide within the opening 212.

The upper slide plate 218, formed of a rigid material, such as a metal or plastic, is positioned against the lower wall 128 of the body 124 and is preferably generally square in shape. The plate 218 includes a recess 222 facing the lower wall 128 that is preferably circular and receives a sealing member 224 (e.g., an O-ring) therein. When the plate 218 is positioned in the opening 212 against the lower wall 128, the sealing member 224 slidingly and sealingly engages the lower wall 128 to provide a hermetic seal between the plate 218 and the lower wall 128.

The upper plate 218 also includes a number of depressions 226 spaced from one another and located adjacent the recess 222. The depressions 226 can be formed directly within the material forming the upper slide plate 218, or can be formed as inserts 232 releasably positioned within a number of pockets 234 formed in the slide plate 218. The depressions 226 receive and retain ball bearings 228 which are capable of rotating with respect to the depressions 226. The bearings 228 are formed of a very hard, rigid material, such as a ceramic, and are engaged opposite the slide plate 218 with a bearing plate 230 disposed in a recess 231 within the lower wall 128. The rolling engagement of the bearings 228 with the bearing plates 230 allows the plate 218 to slide with respect to the lower wall 128 in order to move the slide plate 218 along, as shown in this embodiment by the axis reference 155 in FIG. 2, the Y axis. Also, as the slide plate 218 moves with respect to the lower wall 128, the sealing member 224 continually engages the lower wall 128 to maintain the hermetic seal between the slide plate 218 and the body 124.

The slide plate 218 also includes a number of bores 236 positioned adjacent the center of the slide plate 218 which extend completely through the plate 218. The bores 236 are spaced equidistant from one another and are disposed in a generally triangular configuration on the slide plate 218.

In order to move the slide plate 218 along the Y axis with respect to the lower wall 128, an actuating rod 238 engages one side of the slide plate 218. The rod 238 frictionally abuts one side of the slide plate 218 such that the plate 218 can slide with respect to the rod 238. Opposite the slide plate 218, the rod 238 extends outwardly through a first bore 241 in the positioning member 209 and terminates in a handle 242. The rod 238 is preferably threaded along its exterior such that the rod 238 can be threadedly engaged within the bore 241. By grasping the handle and rotating the rod 238 with respect to the bore 241 into the central opening 212 of the upper member 208, the rod 238 urges the slide plate 218 along the Y axis with respect to the interior chamber 125 of the superstructure 122 against the bias of a first spring member (not shown) disposed opposite the rod 238. Alternatively, rather than biasing the plate 218 with a spring member, a similar threaded rod configuration may be employed opposite rod 238 in surface 211 to translate plate 218 in the negative Y direction.

The lower slide plate 220 is formed of a material similar to the material forming the slide plate 218 and is also generally square in shape. The side of the slide plate 220 opposite the optics assembly 202 includes an upwardly extending flange 244. The flange 244 has a height slightly less than the height of the central opening 212 in the upper member 208 such that the flange 244 defines an abutment capable of engaging the adjacent end of the upper slide plate 218. Slide plate 220 also includes a central, preferably circular, opening 246 having a circumference greater than the circumference of a circle encompassing each of the bores 236 located in the upper slide plate 218.

Adjacent the opening 246 and opposite the flange 244, the upper plate 218 further includes a bearing 250, formed similar to bearings 228, disposed within a depression 252 disposed in the upper slide plate 218 opposite the lower wall 128. The bearing 250 rolls along the lower plate 220 within the depression 252 to enable the upper plate 218 to slide smoothly with respect to the lower plate 220.

The lower plate 220 also includes a number of depressions 254 formed similarly to depressions 226 and spaced equidistant from one another about the circumference of the central opening 246 in alignment with the depressions 226 in the upper plate 218. Each depression 254 receives and retains a bearing 256 formed similarly to the bearings 228 disposed in the upper plate 218. The bearings 256 are each rollingly engaged with a bearing plate 232 located in each spaced end of the support plate 258 disposed beneath the lower plate 220, such that the lower plate 220 can slide with respect to the support plate 258.

In order to slide the lower plate 220 with respect to the chamber 125 along the X axis, an elongate rod 262, formed similarly to the rod 238, slidably contacts one side of the lower plate 220. The rod 262 extends outwardly through a second bore 264 in the upper positioning member 208 and terminates in a handle 266 disposed on the exterior of the AFM 120. Most preferably, the rod 262 is threadedly engaged with the second bore 264 so that the position of the lower plate 220 is altered by rotating the rod 262 with respect to the aperture 264 to move the lower plate 220 against the bias of, for example, a second spring member (not shown) disposed between the plate 220 and the body 124, similarly to the adjustment of the upper plate 218. Also, due to the presence of the flange 244, the adjustment of the lower plate 220 can also move the upper plate 218 when necessary to properly position the plates 218 and 220. When the flange 244 causes the upper plate 218 to move with the lower plate 220, the rod 238 slides along the side of the upper plate 218 so as not to restrict the movement of the plate 218.

The support plate 258 is formed of a material similar to the slide plates 218 and 220 and is fixedly positioned within a number of slots 268 disposed around the periphery of the central opening 214 in the lower support member 210. The support plate 258 is generally Y-shaped, including a central portion 270 and a number of arms 272 extending radially outwardly from the central portion 270. As best shown in FIGS. 5 and 7, the support plate 258 is preferably formed with three equidistant and equal length arms 272 which each rest within one slot 268 disposed around the central opening 214. Each arm 272 includes a recess 273 opposite the central portion 270 in which is disposed a bearing plate 230 that rollingly engages one of the bearings 256 disposed within the depressions 254 on the lower plate 220.

Figure 6:
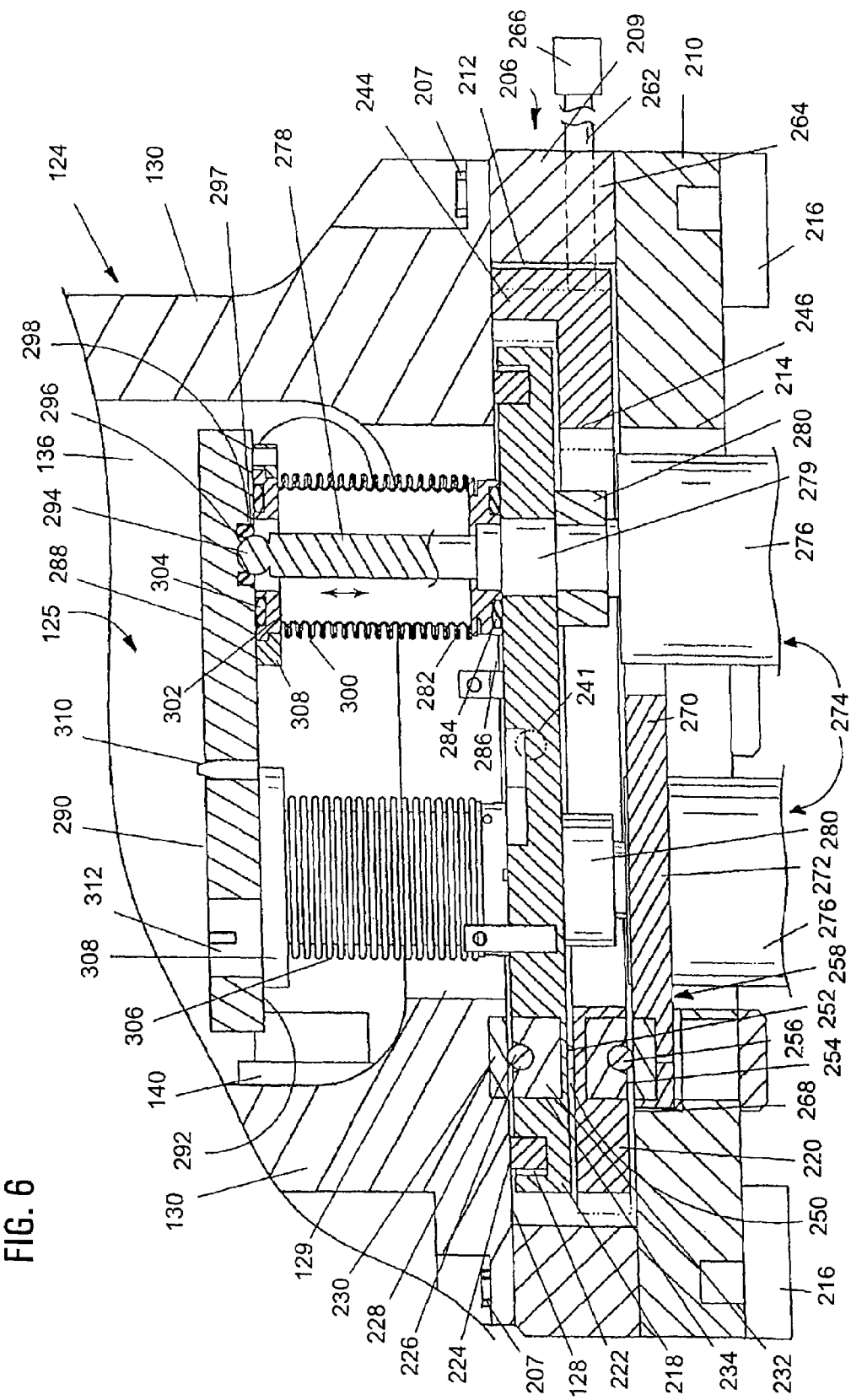
FIG. 6 is a partially broken away cross-sectional view of the x, y, z stage assembly of FIG. 3.

Looking now at FIGS. 3 and 6, the vertical, or Z-axis linear actuators 274 extend upwardly from beneath the base 206 into the interior chamber 125 of the superstructure 122. The actuators 274 each include a lower housing 276 disposed and supported beneath the superstructure 122 by connection to the lower member 210 that extends upwardly between adjacent arms 272 of the support plate 258. A vertically movable shaft 278 extends upwardly out of each housing 276 through the central opening 246 in the lower slide plate 220 and through one of the bores 236 in the upper slide plate 218. The housings 276 each incorporate a suitable lift mechanism, such as an electric or hydraulic mechanism, that is connected to the shaft 278 and to the controller 141 in order to enable the controller 141 to automatically raise and lower the shafts 278.

Each shaft 278 is maintained in alignment within the bores 236 by a guide member 279 frictionally engaged within the bore 236 that is attached to the housing 276 and surrounds the shaft 278, and a collar 280 positioned around the guide member 279 in abutment with the upper slide plate 218 beneath the bore 236. The guide member 279 enables the shaft 278 to move with the upper plate 218 when the upper plate 218 is moved.

Above the upper plate 218, each shaft 278 extends through a lower collar 282 fixedly secured to the upper plate 218 around the associated bore 236. Each collar 282 is formed of a rigid material and includes a circumferential groove positioned against the upper plate 218. The groove 284 retains a sealing member 286 (e.g., an O-ring) that is compressed between the collar 282 and upper plate 218 to provide a hermetic seal around the bore 236.

The shafts 278 extend upwardly through the lower collar 282 into the chamber 125 to contact the lower surface of the interface stage 288. The interface stage 288 is a piece of a rigid material, such as a metal, and preferably a stainless steel such as INVAR®, that is generally rectangular in shape, having a flat upper surface 290 and a generally flat lower surface 292. Each of the shafts 278 terminates in a rounded upper end 294 that is rotatably engaged within one of a number of cavities 296 disposed in the lower surface 292 of the stage 288 to form a kinematic mount 297 between the shaft 278 and the stage 288. Each cavity 296 includes a peripheral sealing member 298 that sealingly engages the upper end 294 of the shaft 278, while also allowing the upper end 294 to slide with respect to the sealing member 298 when the shaft 278 moves with respect to the stage 288. The stage 288 also includes a number of upper collars 300 attached to the lower surface 292 around the cavities 296. Each upper collar 300 is formed identically to the lower collar 282, including a circumferential groove 302 facing the lower surface 292 of the interface stage 288 and containing a sealing member 304 that is compressed between the collar 300 and the stage 288.

The upper collar 300 and lower collar 282 are interconnected by a flexible bellows 306 formed of a relatively flexible, gas-impervious material, such as a hard plastic, or preferably a ribbed sleeve of stainless steel. The bellows 306 is fixedly connected to the lower collar 282 and the upper collar 300 such that an air tight, hermetic seal is formed between the bellows 306 and each of the collars 282 and 300. The upper collar 300 is additionally sealed to the interface stage 288 by a securing collar 308 that is fixed to the lower surface 292 of the stage 288 around the upper collar 300. In this manner, an air-tight, hermetic seal is achieved by the stage assembly 217 with the superstructure 122 between the exterior, ambient environment and the environment within the chamber 125.

Based upon the hermetic seal achieved between the superstructure 122 and the various components of the stage assembly 217, with the AFM 120 of the present invention it is possible to manipulate the position of a sample 144 positioned on the stage 288 along the X, Y and/or Z axis while the chamber 125 is under environmental control, i.e., while the chamber 125 is maintained at a temperature or pressure that is elevated or reduced from the ambient. For example, an operator can cause the sample to be moved in the X or Y directions by using the rods 238 and 262 to slide the plates 218 and 220 and stage 288 operably engaged to the plates 218 and 220 with respect to the superstructure 122. Because the upper plate 218 includes the sealing member 224 that is engaged with the superstructure 122 throughout the entire range of motion of the plate 218, the environment within the chamber 125 can be maintained while the sample 144 is moved. Further, because of the collars 282 and 300 and the bellows 306 disposed around the Z-actuator shaft 278, when the stage 288 is raised, lowered or tilted using the actuators 274, the hermetic seal is maintained between the chamber environment and the exterior environment.

Referring now to FIG. 6, the interface stage 288 includes a pin 310 disposed in the center of the stage 288 and spaced from a slot 312. The pin 310 and slot 312 are used to align or register a sample holder 314, best shown in FIG. 2, to which the sample 144 is fixedly attached on the interface stage 288 directly beneath the probe 166. The sample holder 314 can be fixed to the pin 310 and slot 312 by any suitable releasable securing means, such as a magnet, or simply by pressing the holder 314 onto the pin 310 and slot 312 to form a registration or interference fit with the slot 312 and pin 310.

In addition to fixedly holding the sample 144 on the stage 288, the sample holder 314 also enables the environment within the chamber 125 to be altered as desired using one or more components incorporated onto the sample holder 314. For example, the sample holder 314 can incorporate a heating element (not shown) or a cooling element (not shown) used to change the temperature within the chamber 125. The particular element(s) disposed on the holder 314 can be connected to a separate power supply (not shown) or the controller 141 through the hermetic feed throughs 140 or 145 on the body 124 in order to allow the environment within the chamber 125 to be altered during the scanning of the sample 144 disposed on the sample holder 314. Also, the interior environment of the chamber 125 can be altered to create a vacuum, a low pressure environment or a high pressure environment within the chamber 125 by withdrawing the air contained within the chamber 125 through the vacuum flange 138 disposed on the back panel 136. The flange 138 can also be used to introduce an amount of a specific gas into the chamber 125.

When using the AFM 120, when the sample 144 encounters the environmental changes within the chamber 125, often the sample 144 will experience drift in the X, Y and/or Z directions. In order to obtain an accurate measurement of the surface of the sample 144 when drift occurs, the design of the AFM 120 of the present invention greatly reduces the amount of drift that must be compensated for and also enables the controller 141 to automatically compensate for drift. First, by positioning the pin 310 in the center of the interface stage 288 in alignment with the probe 166, the amount of drift occurring in the X and Y directions is minimized with respect to the sample 144 on the holder 314 due to the fact that any drift occurring in the sample 144 in these directions will not move the center of the sample 144 away from the point of alignment between the pin 310 and the probe 166. Thus, any drift which occurs in the sample 144 can be accommodated for by increasing or decreasing the scan area of the cantilever 164 from the center of the sample 144 as necessary to focus on the portion of the sample 144 of interest. Because the pin is placed symmetric about the probe location, the effects of the lateral drift component are minimized.

Further, when the area of interest in the sample 144 has drifted significantly in the X and/or Y directions due to the changing environmental conditions within the chamber 125, the controller 141 enables the AFM 120 to automatically compensate for this drift when scanning the surface of the sample 144. In the method discussed in Elings et al. U.S. Pat. Nos. 5,077,473 and 5,081,390, which are incorporated herein by reference, the controller 141 can record an image of the surface of the sample 144 under a first environmental condition and record one or more features of the surface of the sample 144 as reference points. When the environmental conditions within the chamber 125 of the AFM 120 containing the sample 144 are subsequently changed, the probe 166 will not be located over the same point on the sample 144 when the first scan was initiated should a certain degree of sample/probe drift occur. In this situation, to ensure that the second scan performed under the changed environmental conditions is conducted over the same scan area of the sample 144, the controller 141 will initiate a quick scan of a large region of the sample 144 in order to locate the reference points recorded from the previous scan. This scan may require that the sample 144 be moved with respect to the probe 166. Once the reference points are located, the controller 141 will compare the location of the reference points in the previous scan to the present location of the reference points in order to compute a correction factor for the drift which has occurred in the sample 144. The controller 141 can then cause the components of the AFM 120 to adjust the position of the sample 144 and conduct a normal scan over the area of interest of the surface of the sample 144. To arrive at an accurate image of that portion of the sample 144, the controller 141 will then apply the calculated drift correction factor to the values obtained by the AFM 120 from the scan.

Figure 10:
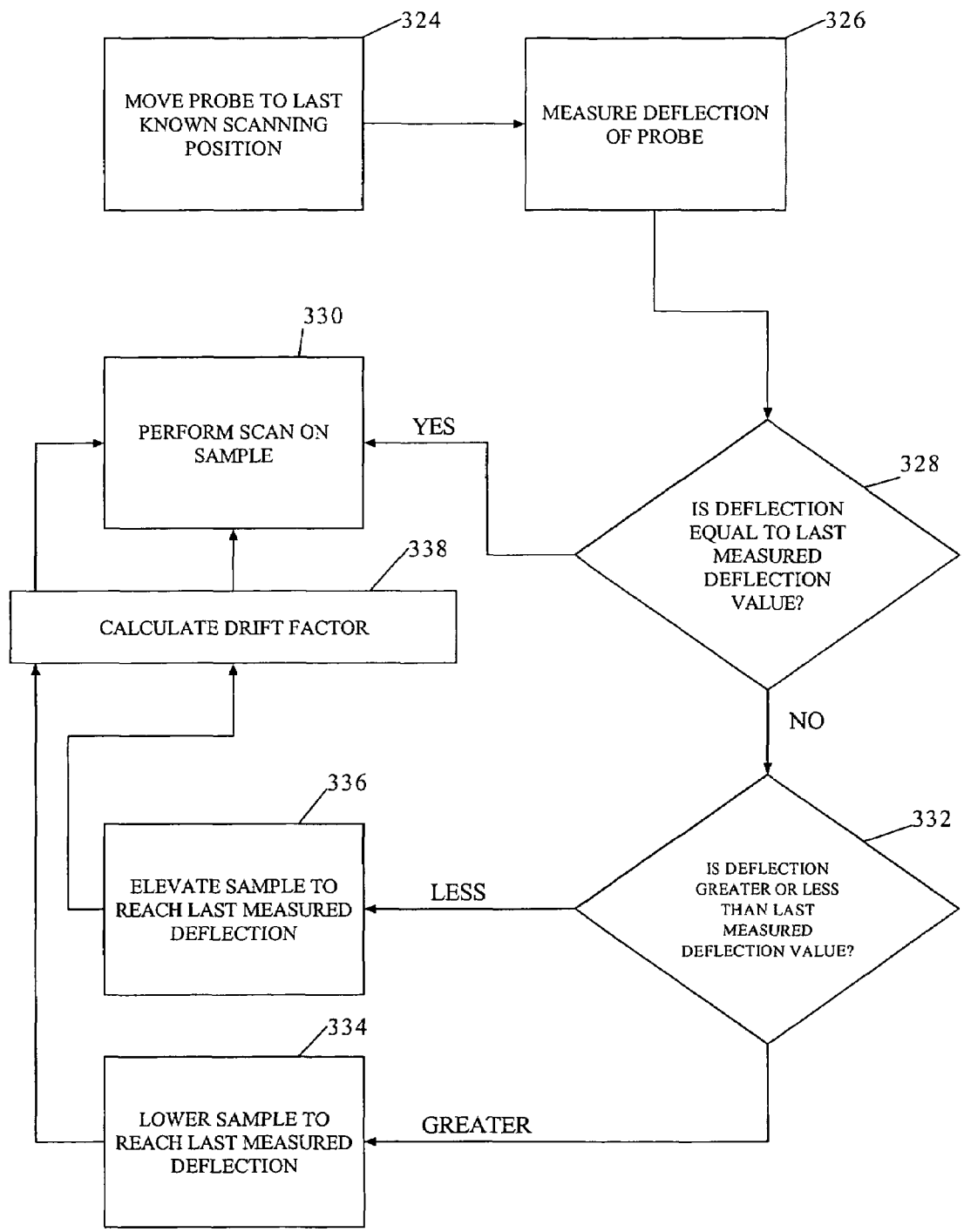
FIG. 10 is a flow chart illustrating the steps of a Z axis drift correction method using the AFM of FIG. 2.

While the AFM 120 of the present invention is capable of compensating for drift in the X and Y directions, as discussed previously, the AFM 120 is also capable of automatically compensating for drift in the Z direction as well. More specifically, as illustrated in FIG. 10, after the completion of a scan, the controller 141 preferably will activate the tube 152 to move the probe 166 a known distance away from the surface of the sample 144 before changing the environmental conditions within the chamber 125. Once the conditions have stabilized, the controller 141 will move the scanning tube 152 to reposition the probe 166 in the last recorded scanning position on the sample 144 as shown in block 324. At this position, in block 326 the controller 141 will measure the deflection of the probe 166. Next, in decision block 328, the controller 141 will then compare the measured deflection to a stored deflection value for that point on the sample obtained during the previous scan. If the values are equal, the controller 141 will proceed to perform a scan of the sample 144 in block 330.

However, if the deflection values are not equal because the probe 166 does not engage the sample 144 at this position, or because the amount of deflection of the probe 166 exceeds the previously measured amount, meaning that the sample 144 has experienced drift in the Z direction based upon the changed environmental conditions, the controller 141 will determine whether the measured deflection value is greater or less than the stored value in decision block 332. After determining this, the controller 141 will actuate the scanning tube 152, and/or the Z-actuators 274 to lower in block 334 or elevate in block 336 the position of the stage 288 with respect to the probe 166. Once the probe 166 and sample 144 are vertically repositioned to create the proper deflection value in block 338, the controller 141 will calculate a drift correction factor for the Z direction and will proceed to block 330 and initiate a second scan, after correcting for any drift in the X and Y direction as well, as described previously. The Z direction correction factor can then be used to arrive at an accurate image of the sample surface once the scan is complete. Notably, a primary goal of the Z drift correction of the present invention is to maintain the position of the sample being analyzed within the Z range of the Z piezo of the tube actuator. Because the typical Z range of a Z piezo used in AFM is approximately 6 microns, it is preferred to keep the sample in the middle of that Z range so the Z tube maintains 3 microns of up/down symmetry.

Figure 11:
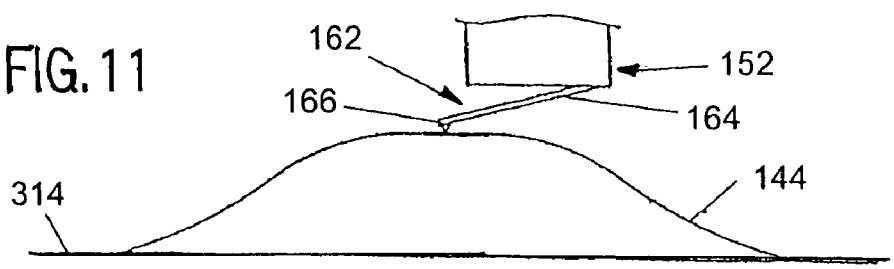
FIGS. 11–13 are schematic views illustrating the sample plane tilt control method performed by the AFM for a sample being scanned.
Figure 12:
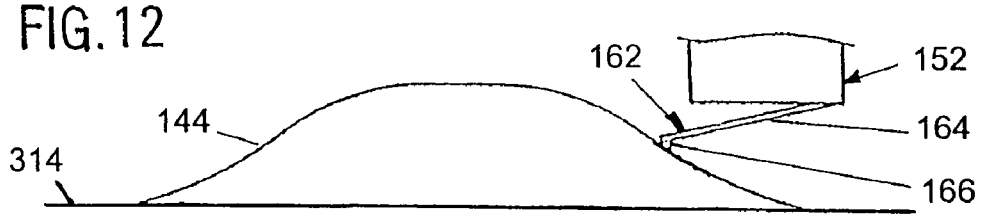
Figure 13:
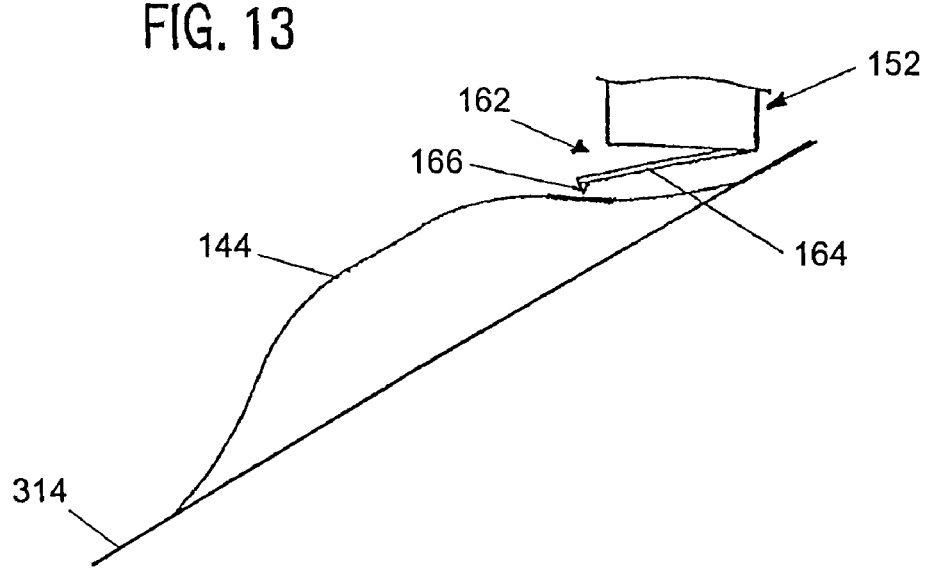
Figure 14:
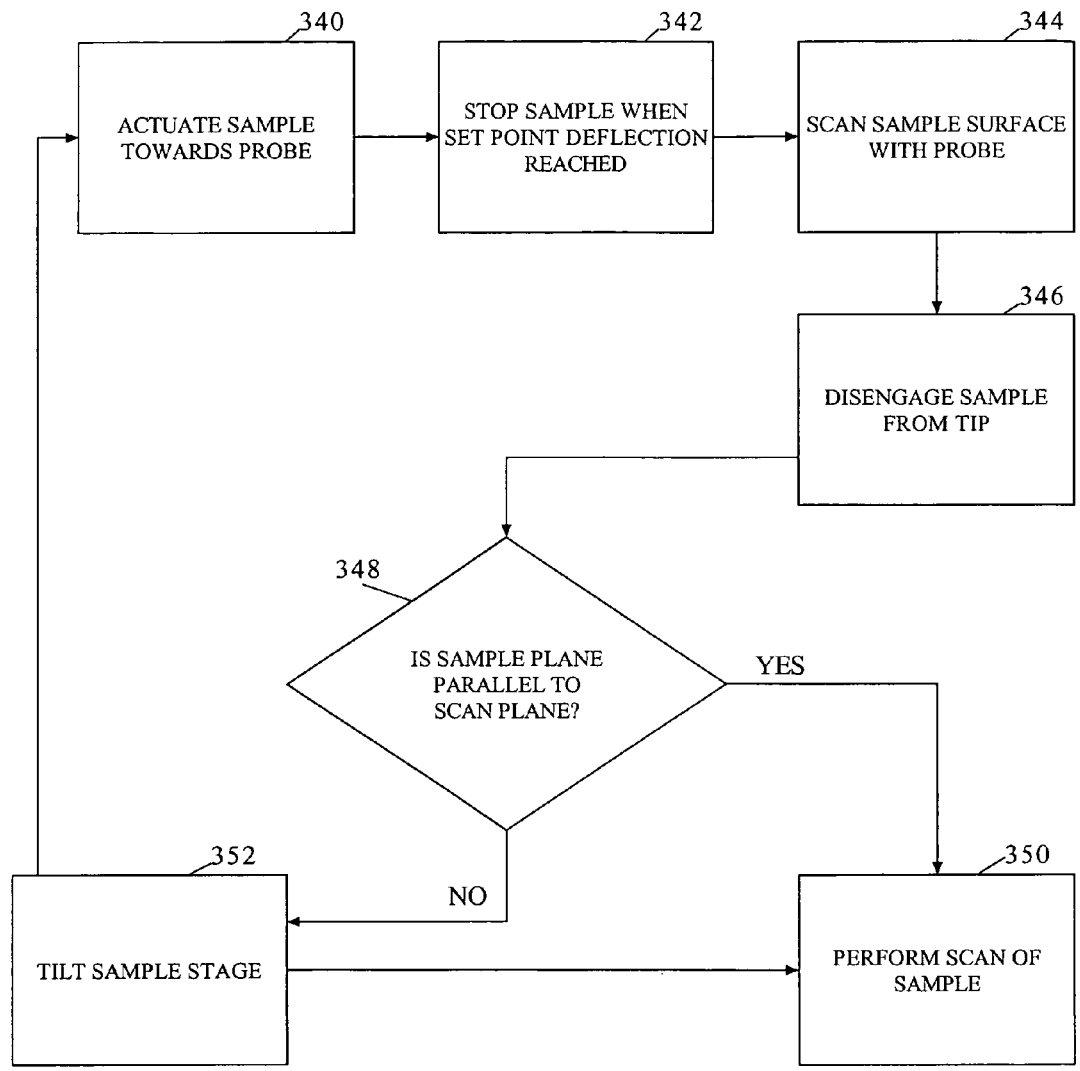
FIG. 14 is a flow chart illustrating the steps of a tip/sample engage method using the AFM of FIG. 2.

Referring now to FIGS. 11–14, the controller 141 can also utilize the Z-actuators 274 to perform a tip-sample engage operation including, for example, correcting for any tilt in the surface of the sample 144 to be scanned (and more particularly, the scan region of interest) with respect to the known scan plane of the probe 166. FIGS. 11–13 illustrate this correction process. Notably, prior to conducting a scan, the controller 141 of the AFM 120 knows the scan plane for the tip of the probe 166 coupled to the scanning tube 152. To perform a scan, the controller 141 in block 340 first moves the sample 144 toward the probe 166 using the Z-actuators 274 at a known speed and in block 342 stops the movement when a specified amount of deflection of the probe 166 is registered, e.g., the set point of deflection. In block 344 the controller 141 will then initiate a quick scan of the sample 144 in the X and Y directions and then disengage the probe 166 from the sample 144 in block 346. The controller 141 uses the results of this scan in decision block 348 to ascertain what the plane of the scan area of the sample 144 is relative to the scan plane of the probe 166 If the controller 141 determines that the scan plane on the sample 144 is parallel to the scan plane of the probe 166 (as in FIG. 1), the controller 141 will proceed in block 350 to scan the sample 144 with the probe 166. However, if the sample plane is not parallel to the scan plane, as shown in FIG. 12, the controller 141 can actuate the Z actuators 274 in block 352 as necessary to tilt the stage 288 and alter the scan plane of the sample 144 in a manner which makes the sample scan plane parallel to the scan plane of the probe 166. This is graphically represented in FIG. 13 where the scan plane of FIG. 12 has been shifted by tilting the stage 288 with the Z-actuators 274 such that the cantilever scan plane is now parallel to the sample scan plane. After aligning the sample plane with the scan plane, the controller 141 can move to block 340 to again check the alignment of the sample plane with the scan plane, or to block 350 to begin a scanning operation of the sample 144.

Although the best mode contemplated by the inventors of carrying out the present invention is disclosed above, practice of the present invention is not limited thereto. It will be manifested various additions, modifications and rearrangements of the features of the present invention may be made without deviating from the spirit and scope of the underlying inventive concept.

We claim:

1. A scanning probe microscope comprising:
   a) a housing having a top wall, a bottom wall and a pair of side walls joining the top and bottom walls, the housing being hermetically sealed from the outside environment for maintaining an ambient or non-ambient condition;
   b) a head assembly sealingly secured to the housing and including an actuator having a probe adapted to engage a sample positioned within the housing;
   c) a stage assembly sealingly secured to and extending through the bottom wall into the interior of the housing, the stage assembly including:
      a base fixed to the bottom wall opposite the head assembly;
      a first slide plate disposed on and movable in a first direction with respect to the base;
      a second slide plate disposed between the bottom wall and the first slide plate, the second plate movable with respect to the base and the first plate in a second direction;
      a first sealing member disposed on the second plate and sealingly engaged with the bottom wall;
      a sample support stage positioned within the interior of the housing and operably connected to the second plate;
      whereby the stage assembly translates the sample without disturbing the ambient or non-ambient condition; and
   wherein the stage assembly further comprises at least one vertical actuator extending through the first plate and through the second plate, and connected to the sample support stage at one end.

2. The scanning probe microscope of claim 1, wherein the first direction and second direction are orthogonal to one another.

3. The scanning probe microscope of claim 1, wherein the first direction and second direction are coplanar.

4. The scanning probe microscope of claim 1, further comprising an actuation device engaged with the first plate and used to move the first plate in the first direction.

5. The scanning probe microscope of claim 4, wherein the actuation device is a manual actuation device.

6. The scanning probe microscope of claim 5, wherein the actuation device comprises a rod engaged at one end to the first plate that extends outwardly through the base and includes a handle opposite the one end.

7. The scanning probe microscope of claim 1, wherein the at least one vertical actuator is connected to the second plate.

8. The scanning plate of claim 7, wherein the second plate is operably connected to the sample support stage by the at least one actuator.

9. The scanning probe microscope of claim 1, further comprising a flexible bellows sealingly secured between the sample support stage and the second plate around the at least one vertical actuator.

10. The scanning probe microscope of claim 9, further comprising a first sealing collar that sealingly connects the bellows to the second plate.

11. The scanning probe microscope of claim 10, further comprising a second sealing collar that sealingly connects the bellows to the sample support stage.

12. The scanning probe microscope of claim 1, wherein the at least one vertical actuator includes a rounded end pivotally engaged within a recess in the sample support stage.

13. The scanning probe microscope of claim 1, wherein the at least one vertical actuator includes three equally spaced vertical actuators independently actuatable to tilt the sample support stage.

14. The scanning probe microscope of claim 1, wherein the base includes a support plate that slidably supports the first plate.

15. The scanning probe microscope of claim 14, further comprising a number of bearings disposed between the first plate and the support plate.

16. The scanning probe microscope of claim 15, wherein the bearings are retained within a number of depressions in the first plate.

17. The scanning probe microscope of claim 16, wherein the bearings engage a number of bearing plates disposed in the support plate beneath the depressions.

18. The scanning probe microscope of claim 15, wherein the bearings are formed from ceramic.

19. The scanning probe microscope of claim 14, wherein the support plate includes a central hub and a number of arms extending radially from the hub.

20. The scanning probe microscope of claim 19, wherein the arms are spaced equidistant from one another.

21. The scanning probe microscope of claim 20, wherein the support plate includes three arms.

22. The scanning probe microscope of claim 1, further comprising an optics assembly sealingly mounted to one of the side.

23. The scanning probe microscope of claim 22, wherein the optics assembly can move with respect to the housing.

24. The scanning probe microscope of claim 23, wherein the optics assembly is mounted generally in alignment with the actuator and the sample support stage.

25. The scanning probe microscope of claim 1, wherein the head assembly includes a mount plate releasably and sealingly secured to the top wall, the mount plate defining an opening extending therethrough and at least one peripheral recess disposed around the opening, at least one sealing member disposed in the at least one peripheral recess, and an optically transparent window secured to one end of the actuator and to the mount plate to sealingly engage at least one sealing member between the window and at least one recess.

26. The scanning probe microscope of claim 25, wherein the window includes a downwardly extending collar that is fixedly engaged to the one end of the actuator.

27. A scanning probe microscope comprising:
a) a housing having a top wall, a bottom wall and a pair of side walls joining the top and bottom walls, the housing being hermetically sealed from the outside environment for maintaining an ambient or non-ambient condition;
b) a head assembly sealingly secured to the housing and including an actuator having a probe adapted to engage a sample positioned within the housing;
c) a stage assembly sealingly secured to and extending through the bottom wall into the interior of the housing, the stage assembly including:
a base fixed to the bottom wall opposite the head assembly;
a first slide plate disposed on and movable in a first direction with respect to the base;
a second slide plate disposed between the bottom wall and the first slide plate, the second plate movable with respect to the base and the first plate in a second direction;
a first sealing member disposed on the second plate and sealingly engaged with the bottom wall;
a sample support stage positioned within the interior of the housing and operably connected to the second plate;
whereby the stage assembly translates the sample without disturbing the ambient or non-ambient condition; and
further comprising a number of bearings disposed between the second plate and the bottom wall.

28. The scanning probe microscope of claim 27, wherein the bearings are retained within a number of depressions in the second plate.

29. A scanning probe microscope comprising:
a) a housing having a top wall, a bottom wall and a pair of side walls joining the top and bottom walls, the housing being hermetically sealed from the outside environment for maintaining an ambient or non-ambient condition;
b) a head assembly sealingly secured to the housing and including an actuator having a probe adapted to engage a sample positioned within the housing;
c) a stage assembly sealingly secured to and extending through the bottom wall into the interior of the housing, the stage assembly including:
a base fixed to the bottom wall opposite the head assembly;
a first slide plate disposed on and movable in a first direction with respect to the base;
a second slide plate disposed between the bottom wall and the first slide plate, the second plate movable with respect to the base and the first plate in a second direction;
a first sealing member disposed on the second plate and sealingly engaged with the bottom wall;
a sample support stage positioned within the interior of the housing and operably connected to the second plate;
whereby the stage assembly translates the sample without disturbing the ambient or non-ambient condition; and
wherein the first plate includes an upwardly extending flange at one end that is engageable with one end of the second plate.

30. The scanning probe microscope of claim 29, wherein the second plate includes a bearing engaged with the first plate and disposed within a depression on the second plate.

31. A scanning probe microscope comprising:
a) a housing having a top wall, a bottom wall and a pair of side walls joining the top and bottom walls, the housing being hermetically sealed from the outside environment for maintaining an ambient or non-ambient condition;
b) a head assembly sealingly secured to the housing and including an actuator having a probe adapted to engage a sample positioned within the housing;
c) a stage assembly sealingly secured to and extending through the bottom wall into the interior of the housing, the stage assembly including:
a base fixed to the bottom wall opposite the head assembly;
a first slide plate disposed on and movable in a first direction with respect to the base;
a second slide plate disposed between the bottom wall and the first slide plate, the second plate movable with respect to the base and the first plate in a second direction;
a first sealing member disposed on the second plate and sealingly engaged with the bottom wall;
a sample support stage positioned within the interior of the housing and operably connected to the second plate; and
whereby the stage assembly translates the sample without disturbing the ambient or non-ambient condition, wherein the actuator includes an X-Y piezoelectric tube and a Z piezoelectric tube.

32. The scanning probe microscope of claim 31, wherein at least one of the X-Y tube and the Z tube is sectioned into an upper section and a lower section.

33. The scanning probe microscope of claim 32, wherein the upper section and lower section are sectioned by disposing corresponding electrodes on the sectioned tube.

34. The scanning probe microscope of claim 32, wherein the length of the upper section electrodes and the lower section electrodes are unequal.

35. A scanning probe microscope comprising:
a) a housing having a top wall, a bottom wall and a pair of side walls joining the top and bottom walls, the housing being hermetically sealed from the outside environment for maintaining an ambient or non-ambient condition;
b) a head assembly sealingly secured to the housing and including an actuator having a probe adapted to engage a sample positioned within the housing;
c) a stage assembly sealingly secured to and extending through the bottom wall into the interior of the housing, the stage assembly including:
a base fixed to the bottom wall opposite the head assembly;
a first slide plate disposed on and movable in a first direction with respect to the base;
a second slide plate disposed between the bottom wall and the first slide plate, the second plate movable with respect to the base and the first plate in a second direction;
a first sealing member disposed on the second plate and sealingly engaged with the bottom wall;
a sample support stage positioned within the interior of the housing and operably connected to the second plate; and
whereby the stage assembly translates the sample without disturbing the ambient or non-ambient condition, wherein the sample support stage includes an indexing element to position a sample holder at a preselected position relative to the probe.

36. The scanning probe microscope of claim 35, wherein the indexing element is a pin extending outwardly from the sample support stage.

37. A scanning probe microscope (SPM) comprising:
a) a housing having a top wall, a bottom wall and a pair of side walls joining the top and bottom walls, the housing being hermetically sealed from the outside environment for maintaining an ambient or non-ambient condition;
b) a head assembly sealingly secured to the housing and including an actuator having a probe adapted to engage a sample positioned within the housing;
c) a stage assembly sealingly secured to and extending through the bottom wall into the interior of the housing, the stage assembly including:
a base fixed to the bottom wall opposite the head assembly;
a first slide plate disposed on and movable in a first direction with respect to the base;
a second slide plate disposed between the bottom wall and the first slide plate, the second plate movable with respect to the base and the first plate in a second direction;
a first sealing member disposed on the second plate and sealingly engaged with the bottom wall;
a sample support stage positioned within the interior of the housing and operably connected to the second plate;
whereby the stage assembly translates the sample without disturbing the ambient or non-ambient condition; and
further comprising a sample support stand coupled to the second slide plate for supporting the sample.

38. A scanning probe microscope (SPM) comprising: a superstructure defining a hermetically sealed housing within which a probe and a sample are disposed so as to allow the SPM to analyze the sample;
a stage assembly hermetically sealed to the superstructure; and
wherein the stage assembly provides relative movement between the probe and the sample and includes (1) a first slide plate movable in a first direction with respect to the superstructure, (2) a second slide plate disposed between the superstructure and the first slide plate, the second slide plate movable with respect to the superstructure and the first slide plate in a second direction, and (3) a first sealing member disposed on the second slide plate and sealingly engaged with the superstructure, wherein the stage assembly further comprises at least one actuator extending through the first plate and through the second plate, and connected to the sample support stage at one end.

39. The scanning probe microscope of claim 38, wherein the at least one actuator is connected to the second plate.

40. The scanning probe microscope of claim 38, further comprising a flexible bellows sealingly secured between the sample support stage and the second plate around the at least one actuator.

41. The scanning probe microscope of claim 38, wherein the at least one actuator includes a rounded end pivotally engaged within a recess in the sample support stage.

42. The scanning probe microscope of claim 38, wherein the at least one actuator includes three equally spaced vertical actuators independently actuatable to tilt the sample support stage.

* * * * *